United States Patent [19] [11] 4,153,737
Berg et al. [45] May 8, 1979

[54] CONCENTRATED LIQUID LOW CALORIE SWEETNER

[75] Inventors: Jeffrey H. Berg, New York, N.Y.; Gerhard J. Haas, Woodcliff Lake, N.J.

[73] Assignee: General Foods Corporation, White Plains, N.Y.

[21] Appl. No.: 781,604

[22] Filed: Mar. 28, 1977

Related U.S. Application Data

[63] Continuation of Ser. No. 347,306, Apr. 2, 1973, abandoned, which is a continuation-in-part of Ser. No. 239,792, Mar. 30, 1972, abandoned.

[51] Int. Cl.² ............................................. A23L 1/236
[52] U.S. Cl. ..................................................... 426/548
[58] Field of Search ............................................ 426/548

[56] References Cited

U.S. PATENT DOCUMENTS

| 3,475,403 | 10/1969 | Mazur et al. | 426/548 |
| 3,642,491 | 2/1972 | Schlatter | 426/548 |
| 3,695,898 | 10/1972 | Hill et al. | 426/548 |
| 3,769,333 | 10/1973 | Lapidus et al. | 426/548 |
| 3,798,204 | 3/1974 | Nakajima et al. | 426/548 |

FOREIGN PATENT DOCUMENTS 2102988 7/1971 Fed. Rep. of Germany ........... 426/548

OTHER PUBLICATIONS

Mazur et al, JACS., 91:10, May 7, 1969, pp. 2684–2691.

Primary Examiner—Raymond N. Jones
Assistant Examiner—Elizabeth A. Hatcher
Attorney, Agent, or Firm—Richard Kornutik

[57] ABSTRACT

Concentrated solutions of dipeptide salts in non-aqueous edible carriers give readily soluble refrigerator-stable liquid sweetners.

10 Claims, No Drawings

CONCENTRATED LIQUID LOW CALORIE SWEETNER

CROSS-REFERENCE TO RELATED APPLICATION

This application is a continuation of application Ser. No. 347,306, filed Apr. 2, 1973; and which is a continuation-in-part of application Ser. No. 239,792, filed Mar. 30, 1972 both now abandoned, entitled "Inorganic Salts of Dipeptide Sweeteners."

BACKGROUND OF THE INVENTION

The present invention relates to dipeptide sweetening compositions having improved solubility and storage-stability without significant loss of original sweetness. More specifically, it relates to the incorporation of the alkaline earth salts of dipeptide sweeteners into liquid non-aqueous hydrophilic solvents to provide a concentrated, readily soluble liquid sweetener.

It has been found that certain dipeptide compounds possess an intense sweetness. Examples of these compounds are set forth in U.S. Pat. Nos. 3,475,403 issued Oct. 28, 1969, 3,492,131 issued Jan. 27, 1970, 3,642,491 issued Feb. 15, 1972 and in the following published foreign patents; Republic of South Africa Patent Applications Nos. 695,083 filed July 12, 1969, 695,910 filed Aug. 14, 1969, German Pat. No. 2,054,545 published May 19, 1971 and British Pat. No. 1,042,488 published Sept. 14, 1966.

Generically, these compounds are represented by the Formula:

$$H_2N-CH-CONH-CH-COOR \quad\quad I$$
$$\quad\quad\ \ |\quad\quad\quad\quad\ \ \ |$$
$$\quad\ \ CH_2COOH\quad (CH_2)_n R_1$$

Wherein R represents the lower alkyls, lower alkylaryls and cycloalkyls; n stands for integers 0-5; $R_1$ represents a) phenyl group, b) lower alkyls, c) cycloalkyls, d)

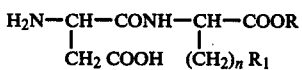

where $R_2$ is hydroxy, lower alkoxy, lower alkyl, halogen, e) S(O)m where n is 1 or 2 and provided m is 0,1 or 2, f)

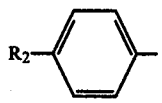

where $R_3$ represents an hydroxy or alkoxy and g)

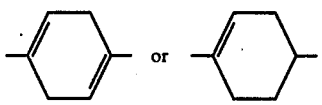

single or double unsaturated cycloalkyls with up to eight carbons.

Most suitable among these compounds are the lower alkyl esters of aspartyl phenalanine (U.S. Pat. No. 3,492,131) wherein the sterochemical configuration is DL-L, L-DL, DL-DL, or L-L.

The dipeptides of Formula I have significant sweetening properties. Problems have arisen however, with the use of these compounds in a liquid sweetener-type product in that their concentration in water is minimal, their rate of solubility is markedly slower than sucrose and their stability in aqueous solution is poor rendering non-sweet primary decomposition products.

SUMMARY OF THE INVENTION

It has been found that the inorganic salts of the dipeptide sweeteners when incorporated into a non-aqueous hydrophilic medium exhibit improved solubility over both the unsubstituted dipeptide and the dipeptide salt when the same are present in such a liquid medium. In addition, the dipeptide salt when placed in a non-aqueous hydrophilic solvent renders a solution offering improved stability in comparison with the dipeptide and dipeptide salt in water-based solutions. Specifically, the alkaline earth salts of the lower alkyl esters of aspartyl phenalanine in liquid non-aqueous polar solvents are sweet, can be prepared at higher concentrations, thus reducing the amount of liquid sweetener required and are more stable than in aqueous solution. Particularly preferred are the alkaline earth salts of L-aspartyl-L-phenalanine methyl ester, such as the potassium salt thereof said methyl ester hereinafter known as APM.

The inorganic salts of the dipeptide sweeteners of this invention are prepared both by substituting the amine group on the aspartic acid portion of said dipeptide or by substituting the carboxyl group on said acid portion. The maintenance of the sweet character was surprising due to contradictory information which appeared in the May 7, 1969 issue of the "Journal of the American Chemical Society" (p. 2685) which referred to the criticality of maintaining the unsubstituted amine group on the aspartic acid portion of the L-L-isomer of aspartyl phenalanine methyl ester for the preservation of sweetness. In like manner, the increased solubility of the inorganic salts in liquid polar solvents, as opposed to their solubility in water, was indeed surprising due to the polarity of the latter and therefore the greater solubility expected in the same. Preferred liquid polar solvents include the edible alcohols ethanol, particularly the polyhydric alcohols such as propylene glycol, glycerine and mixtures thereof.

It is the general purpose of this invention to provide liquid sweeteners of improved concentration and stability. To attain this, the present invention uses a dipeptide salt incorporated into an edible polar non-aqueous alcoholic carrier, which salt may at the same time be combined with an artificial sweetener such as saccharin or a soluble salt thereof which combination would effect a sizeable reduction in the production and marketing costs of the liquid sweetener since the dipeptide salts as a whole are more expensive than other artificial sweeteners such as saccharin. The high concentration of a dipeptide salt allows normal use of the liquid sweetener in a manner similar to those available prior to the "cyclamates" ban. For example 6 to 10 drops of the potassium salt of L-aspartyl-L-phenalanine methyl ester at near saturation in propylene glycol reduces the volume of liquid sweetener necessary at least twofold compared to the unmodified L-aspartyl L-phenalanine methyl ester in saturated solution in either water or propylene glycol. The near saturated salt solution remains stable and sweet at refrigerated temperatures.

DESCRIPTION OF THE INVENTION

The dipeptide salts of this invention are described by the Formula:

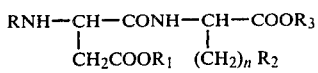

$$RNH-CH-CONH-CH-COOR_3 \quad\quad II$$
$$\phantom{RNH-}CH_2COOR_1 \phantom{xx} (CH_2)_n R_2$$

Wherein the stereochemical configuration is DL-DL, DL-L, L-DL, or L-L; R represents $H_4PO_4+$, $H_3SO_4+$, $H_2NO_3+$ or hydrogen; $R_1$ represents sodium, potassium, calcium, ammonium, or hydrogen, $R_2$ and $R_3$ corresponding to $R_1$ and R of Formula I respectively.

Representative of the inorganic salts of the dipeptide of this invention are sodium L-aspartyl-L-phenylalanine methyl ester potassium L-aspartyl-L-cyclohexylalanine methyl ester, L-aspartyl-L-phenylglycine methyl ester dihydrogen phosphate, L-aspartyl-L-S-methyl cysteine sulfone methyl ester dihydrogen phosphate and the like.

The inorganic salts are prepared by forming a solution of the dipeptide sweetener and the inorganic compound in a solvent and removing the solvent by known means. This can be done by forming a solution of the dipeptide in a solvent and contacting the dipeptide with the inorganic compound to form a soluble salt or by dissolving the dipeptide in an alkaline solvent medium. In the case of the potassium salt of L-aspartyl-L-phenylalanine methyl ester for example, an aqueous solution of the latter is neutralized with an equimolar concentration of potassium carbonate. The resulting solution is freeze dried yielding the potassium salt of aspartyl phenylalanine methyl ester.

Accordingly, a saturated solution of the salt of the dipeptide, in this case the potassium salt of aspartyl phenylalanine, is readily obtained with stirring upon addition of as much as 11% by weight of the sweetener to the non-aqueous solvent at room temperature offering a concentrated liquid sweetener which is economical to produce and a valuable commodity to the class of sweeteners.

It is preferred that at least 5% by weight, and more preferably at least 10% of the dipeptide salt in alcohol be employed, the preferred alcohol being propylene glycol both for reasons of solubility and for forming a concentrated liquid sweetener.

In an embodiment of this invention, the inorganic salt of the dipeptide may be combined with an artificial sweetener such as a saccharin in an alcoholic carrier such as ethanol, propylene glycol or the like. Any known suitable form of saccharin may be employed, the preferred dipeptide sweetener being the potassium salt of L-aspartyl-L-phenylalanine methyl ester. The ratio of saccharin to dipeptide salt can vary widely depending upon the material to be sweetened.

The ratio of saccharin to dipeptide should be adjusted to prevent a bitter after-taste from the saccharin in addition to necessary cost consideration, the resulting ratio normally being from about 1 to 1 to about 1 to 10 of saccharin to dipeptide salt. The preferred embodiment is 1 part of a soluble salt of saccharin such as ammonium or the like to 4 parts of the potassium salt of aspartyl phenylalanine methyl ester dissolved in propylene glycol wherein the propylene glycol is at least 5%, preferably at least 10% saturated with the potassium salt.

The significance of the more soluble - more stable properties of the inorganic salts, particularly the potassium salt when incorporated into a non-aqueous solvent either alone or in combination with an artificial sweetener cannot be over emphasized for it fills the need for a highly-concentrated, low calorie sweetener and refrigerator-stable product.

Such sweeteners are extremely useful in hot beverage systems e.g. coffee or tea where approximately 8 or 9 drops of the dipeptide liquid sweetener is equivalent in sweetness to one teaspoon of sugar. In cold beverages, especially those which are carbonated and therefore cannot tolerate stirring, the need for a readily soluble sweetener is satisfied. For comparison, the amount of stirring needed to effectively put the aspartyl phenylalanine methyl ester into solution removes most, if not all carbonation.

Such a liquid, low-calorie sweetener may find utility in such foodstuffs as gelatin desserts, fruit flavored beverages, cereal, cake mixes, fruit juices, syrups, salad dressings, pet foods and the like. However, it should be obvious to those skilled in the art that its utility is not restricted to the systems set forth herein and may find invaluable application in cough medicines, tonics and the like. The most preferred embodiment of this invention contemplates a liquid table sweetener as a replacement for sucrose and previously employed liquid sweeteners.

Suitable carriers for incorporating the sweet dipeptide salts regardless of whether they are combined with an artificial sweetener are liquid non-aqueous, polar solvents such as ethanol, polyhydric alcohols such as glycerol, propylene glycol, 1,3-butylene glycol and mixtures thereof propylene glycol being the preferred solvent of this invention. When the dipeptide sweetener, whether or not in combination with an artificial sweetener, is incorporated into such solvents it is preferred that said solvents be nearly saturated with the dipeptide sweetener by which is meant that the solvent be within 12% of saturation at the temperature of storage.

The accompanying table summarizes the solubility of several inorganic salts of L-aspartyl-L-phenylalanine methyl ester, specifically the potassium salt (K.APM), and the sodium salt (Na-APM) in comparison with the unsubstituted dipeptide (APM) in various solvents. The purpose of this study was to determine the preferred solvent for use in a concentrated liquid sweetener with respect to the solubility of these salts in the same at room temperature.

Table I

| Sweetener | Propylene glycol | Glycerol | 1,3-Butylene glycol |
|---|---|---|---|
| APM | 0.68% | .094% | 0.2% |
| Na . APM | 6.7% | .509% | 0.5% |
| K . APM | 11.35% | 9.43% | 0.7% |

As is evident from the above data, the inorganic salts of APM, particularly the potassium salt, are appreciably more soluble than unsubstituted APM in inorganic solvents, the apparent preferred dipeptide salt of this invention being the potassium salt of L-aspartyl-L-phenylalanine methyl ester in propylene glycol. All the results represent the solubility of the freeze-dried salt form.

In accordance with this invention, there are given specific examples illustrative of the present invention. However, these examples are not to be construed as restrictive of the invention, as it is obvious that specific systems may be mentioned without limiting the scope of the invention.

EXAMPLE I

A 1% aqueous solution of L-aspartyl-L-phenylalanine methyl ester was neutralized with an equimolar amount of sodium bicarbonate. The solution was subsequently freeze dried. A solution of 6% of the sodium salt of L-aspartyl-L-phenylalanine methyl ester in propylene glycol was prepared and 12 drops of the same placed in a cup of hot black coffee. This sample was compared to a cup of coffee containing a sweetness equivalent level of sucrose. The sample containing the dipeptide sweetener was judged to have an equally sweet, pleasing taste and the liquid sweetener readily dissolved in the hot beverage.

EXAMPLE II

The potassium salt of L-aspartyl-L-phenylalanine methyl ester (APM) was prepared in the following manner:

To a solution of APM (5 g; 0.017 mole) in water (500 ml) was added 1.70 g $KHCO_3$ (0.017 mole). The resulting solution was freeze dried and the K.APM dissolved in propylene glycol to make an overall concentration of 11% of the dipeptide salt.

Amounts of sucrose and concentrated liquid sweetener which were equivalent with regards to their sweetness levels were each placed separately in an 8 oz. glass of ice tea. The liquid sweetener dissolved faster than the sucrose sample and rendered a product pleasingly sweet in taste.

What is claimed is:

1. A concentrated liquid low calorie sweetening composition comprising a mixture of propylene glycol and at least 5% by weight of a dipeptide salt selected from the group consisting of the sodium salt of L-aspartyl-L-phenylalanine methyl ester and the potassium salt of L-aspartyl-L-phenylalanine methyl ester.

2. The composition of claim 1 wherein the salt is incorporated in the propylene glycol in an amount sufficient to render the propylene glycol nearly saturated at refrigeration temperature.

3. The composition of claim 1 wherein the sweetener is an artificial sweetener.

4. The composition of claim 3 wherein the artificial sweetener is a saccharin.

5. The composition of claim 4 wherein the saccharin is a soluble salt of saccharin.

6. The composition of claim 4 wherein the saccharin and salt of L-aspartyl-L-phenylalanine methyl ester are in the ratio of about 1:1 to about 1:10 by weight of saccharin to the salt of L-aspartyl-L-phenylalanine methyl ester.

7. The composition of claim 6 wherein the saccharin and salt of L-aspartyl-L-phenylalanine methyl ester are in the ratio of about 1:4 by weight of the saccharin to the salt of L-aspartyl-L-phenylalanine methyl ester.

8. A method of sweetening a foodstuff which comprises adding to the foodstuff an effective amount of a concentrated liquid low calorie sweetener, said sweetener comprising a mixture of propylene glycol and at least 5% by weight of a dipeptide salt selected from the group consisting of the sodium salt of L-aspartyl-L-phenylalanine methyl ester and the potassium salt of L-aspartyl-L-phenylalanine methyl ester.

9. The composition of claim 8 wherein the sweetener is an artificial sweetener.

10. The method of claim 9 wherein the artificial sweetener is saccharin.

* * * * *